(12) United States Patent
Vinouze et al.

(10) Patent No.: US 7,136,548 B2
(45) Date of Patent: Nov. 14, 2006

(54) LIQUID CRYSTAL OPTICAL SWITCH WITH BURNT-IN CONTROL

(75) Inventors: Bruno Vinouze, Port Blanc (FR); Nicole Wolffer, Saint Quay Perros (FR); Roger Lever, Plourin-les-Morlaix (FR); Philippe Gravey, Lannion (FR)

(73) Assignee: France Telecom, Paris (FR)

( * ) Notice: Subject to any disclaimer, the term of this patent is extended or adjusted under 35 U.S.C. 154(b) by 143 days.

(21) Appl. No.: 10/311,398

(22) PCT Filed: Jun. 15, 2001

(86) PCT No.: PCT/FR01/01874

§ 371 (c)(1),
(2), (4) Date: May 5, 2003

(87) PCT Pub. No.: WO01/96938

PCT Pub. Date: Dec. 20, 2001

(65) Prior Publication Data

US 2005/0018954 A1    Jan. 27, 2005

(30) Foreign Application Priority Data

Jun. 16, 2000    (FR) .................................. 00 07756

(51) Int. Cl.
*G02B 6/35* (2006.01)
(52) U.S. Cl. ........................................... 385/16
(58) Field of Classification Search ............. 385/16–24
See application file for complete search history.

(56) References Cited

U.S. PATENT DOCUMENTS 5,440,654 A * 8/1995 Lambert, Jr. .................. 385/17
5,648,859 A * 7/1997 Hirabayashi et al. .......... 349/9
5,699,078 A    12/1997 Yamazaki et al.
5,930,012 A * 7/1999 Mears et al. .................. 359/15
5,963,682 A    10/1999 Dorschner et al.

FOREIGN PATENT DOCUMENTS

JP    03204621 A  *  9/1991
JP    06082845 A       3/1994
JP    09096841 A  *  4/1997

OTHER PUBLICATIONS

N. Wolffer, et al., "Holographic switching between single mode fibres based on electrically addressed nematic liquid crystal gratings with high deflection accuracy," Optics Communications 160 (1999) 42-46, Feb. 1, 1999, Published by Elsevier Science B.V.
NTT Electronics, "Thermo-Optic Switches" (3 pages).

(Continued)

Primary Examiner—Michelle Connelly-Cushwa
(74) Attorney, Agent, or Firm—Cohen, Pontani, Lieberman & Pavane

(57) ABSTRACT

The invention concerns a switch for optical beams comprising a series of optical input channels (110 . . . 150) and a series of optical output channels (410 . . . 450), two liquid crystal cells respectively adapted to deflect an optical beam coming out of an input channel (110 . . . 150) or arriving onto an output channel (410 . . . 450), said two cells comprising each a series of electrodes adapted to orient liquid crystals when one such electrode is subjected to a supply voltage said electrodes being distributed in zones (210 . . . 250, 310 . . . 350), each zone corresponding to a single input channel (110 . . . 150) or a single output channel (410 . . . 450), the switch further comprising means for supplying the electrodes with selected voltages. The invention is characterised in that it comprises a series of separate electronic circuits, each being connected to at least a different zone (210 . . . 250) of a given cell, said circuits being each capable of transforming a respective control signal indicating a channel to be coupled to the channel of said zone (210 . . . 250, 310 . . . 350) into a series of supply voltages for the electrodes of the zone (210 . . . 250, 310 . . . 350).

12 Claims, 5 Drawing Sheets

OTHER PUBLICATIONS

JDS Uniphase, "Optical Switching for Network Applications" (11 pages).

Kazuhiro Noguchi, "Transparent Optical Crossbar Switch Using Liquid-Crystal Optical Light Modulator Arrays," ECOC 97, Sep. 22-25, 1997, Conference Publication No. 448 (4 pages).

L. Bonnel, "Holographic switching between single mode fibres : evaluation of a 16 × 16 demonstrator and perspectives," Photonics in Switching, Sendai, Apr. 21-25, 1996 (2 pp).

* cited by examiner

LIQUID CRYSTAL OPTICAL SWITCH WITH BURNT-IN CONTROL

The present patent application is a non-provisional application of International Application No. PCT/FR01/01874, filed Jun. 15, 2001.

The invention relates to equipment for switching optical beams, for transport channel routing functions.

These systems are used for interconnecting one to another and independently, the optical fibers of an input cable to those of an output cable.

This type of equipment can be used in optical cross-connect or switching equipment. Another potential application relates to making optical loops of a transport network secure, the system providing re-routing at a node.

More generally, such equipment relates to all fields in which the routing of optical fibers is necessary.

Current cross-connect systems use the principle of conventional electronic routing of the switches. Upon entering the cross-connect units, the optical beams are converted into electrical signals by photodiodes and then electronic routing is carried out conventionally. Upon leaving the cross-connect unit and in the fiber in question, a laser emits an optical beam at the appropriate wavelength and the appropriate modulation frequency.

Other systems exist that operate in free space. The most advanced equipment is made up of mechanical components mounted on stepper motors that align the fibers one with respect to another. At the present time, these machines, sold by JDS [1], allow up to 32 fibers to be interconnected. Such equipment is currently used in optical transport networks.

A third type of router uses a guided propagation on a substrate and the routing is performed by heating a guiding region. NEL sells a router switch of 8×8 capacity producing thermooptic technology from silica guides on a silicon substrate [2]. Akzo-Nobel sells 1×8 router switches using guides made of a polymer material on a silicon substrate [3].

Other approaches have been explored in the laboratory, particularly systems that combine liquid-crystal cells with birefringent calcite crystals. These systems employ electrically addressed cells which can modify the polarization state of the optical beam. Depending on the polarization, the beam is then deflected or not [4].

Studies have been undertaken on holographic deflection systems using a photothermoplastic material. Diffraction gratings that are photowritten in this material deflect the optical beams. A system of 16×16 capacity has been produced in the laboratory [5].

Electronic cross-connect systems using optoelectronic conversion and electronic routing are limited to data rates of the order of 2.5 gigabits/s as the electronic components that provide the switching are limited in terms of operating frequency. Although the constant improvements made to integrated circuits are pushing the operating limits to ever higher frequencies, the data rates that large-capacity cross-connect units require will be very difficult to achieve using this technology.

Mechanical routers using stepper motors have the advantage, thanks to high fiber alignment precision, of causing the optical fibers passing through them to be only slightly attenuated. On the other hand, these systems are slow as they may require substantial displacements. In addition, this response time (typically 1 second) is proportional to the capacity of the system. The use of many mechanical moving parts may pose problems of wear, repeatability and therefore reliability. Finally, the cost of these machines is currently very high, thereby limiting, of course, their integration into the networks.

Routers based on planar technologies are currently produced on a silicon substrate and the capacity of these systems is limited inter alia by the dimensions of the available substrates (or wafers). To the routers themselves must be added the space taken up by the optical guides that provide the interconnections—this is because the radius of curvature of the guides must be large enough not to generate optical losses. With current substrates, the capacities seem to be limited to 16×16.

Liquid-crystal systems using the technique of polarization rotation require a large number of cells and birefringent crystals to be cascaded in order to achieve substantial capacities. This incurs considerable cost, a substantial amount of space and potentially high losses. In addition, this technique requires a large number of switching stages in order to circumvent blocking configurations.

Also proposed, in [6], is an optical beam router comprising two liquid-crystal cells each provided with a series of electrodes in order to generate a medium having an inhomogeneous optical index, of distribution chosen for a precise deflection of each beam. However, the device in that document requires electrode supply arrangements that are complex and difficult to implement.

The principal object of the invention is to solve this drawback, that is to say to provide a router based on deflection by liquid-crystal cells, which has control configurations that facilitate its implementation and reduce its production costs.

This object is achieved according to the invention by means of an optical beam router comprising a series of input optical channels and a series of output optical channels, two liquid-crystal cells capable respectively of deflecting an optical beam exiting an input channel or entering an output channel, these two cells each comprising a series of electrodes each capable of orienting liquid crystals when such an electrode is supplied with a supply voltage, these electrodes being distributed in regions, each region corresponding to an associated single input channel or single output channel, the router furthermore including means for supplying the electrodes with selected voltages, characterized in that it includes a series of separate electronic circuits, each being connected to at least one different region of a given cell, these circuits each being capable of converting a respective control signal indicating a channel to be coupled to the channel of this region into a series of voltages for supplying the electrodes of the region.

Further objects, features and advantageous of the invention will become more apparent on reading the detailed description that follows, given with reference to the appended figures in which.

The device described here is an optical beam router of eight-fiber by eight-fiber capacity that is completely integrated into a connectorized cabinet and possesses control electronics and addressing software.

Figure 1:
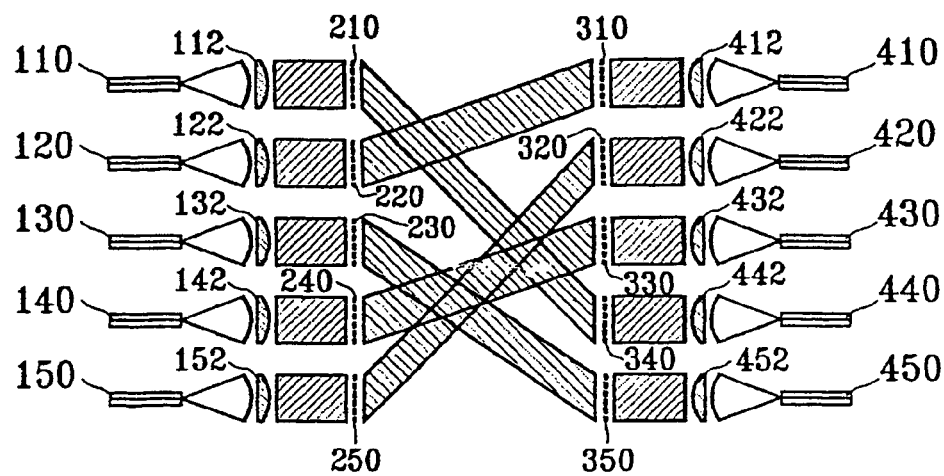
FIG. 1 is a side view of a router according to the invention.

The diagram in FIG. 1 describes the optical functionality of the device applied to the inter-connection of five fibers out of the eight.

This equipment makes it possible to route a beam coming from any input fiber 110 to 150 by means of a liquid-crystal cell 200 and to deflect, by means of a second cell 300, the beams as they enter the output fibers 410 to 450. The interconnections are made fiber-to-fiber, by deflecting, by means of the two planes 200 and 300, the optical beams that propagate in free space.

The equipment performs the routing of optical channels and the reconfiguration times are of the order of 100 milliseconds or so. This equipment is inexpensive as it uses the technology of liquid-crystal cells. Finally, this technology allows high capacities to be achieved.

The deflection is carried out by means of diffractive pneumatic liquid-crystal cells that generate phase gratings. The diffraction gratings are created by the application, to electrodes such as those labeled 510 to 580 and shown in detail in FIG. 2, of alternating voltages, that is to say alternating voltages at the terminals of the liquid crystal 600 contained in the cells.

The input fibers 110 to 150 are equidistant and placed in a linear array. They are followed by microlenses 112 to 152, the function of which is to make the optical beams nondivergent over their entire propagation length.

Each cell 200 and 300 has a series of regions each corresponding to one fiber. These regions are also called here "holograms". A first plane of holograms deflects each beam in a very precise direction. Next, the second liquid-crystal cell 300 straightens out the beams, which are then injected into the output fibers 400 to 450 by means of output microlenses 412 to 452 positioned in front of the linear arrays 410 to 450. The fibers, the lenses and the holograms (or "regions") have the same pitch and are precisely aligned one with respect to another so as to minimize the losses [6].

The input regions 210 to 250 are formed by a single input liquid-crystal cell 200 and the output region's 310 to 350 are formed by a single output liquid-crystal cell 300, constituting the active elements that deflect the beams.

These cells are made up of two glass plates 500 separated by a few microns, into which the liquid crystal 600 is inserted.

One of the glass plates is entirely covered with a transparent conducting electrode 555—this is the back electrode. The other glass plate possesses transparent conducting regions 510 to 580 which are etched in a very specific pattern—these are the electrodes.

The electrodes 510 to 580 have a high length-to-width ratio—typically they are a few microns in width by a few millimeters in length. The space between the electrodes, or interelectrode space, is very critical—it is also a few microns.

For each region or hologram, a large number of these electrodes are juxtaposed so as to completely cover a beam whose diameter is from 1 to 2 millimeters.

Through the construction of the cell, the initial alignment of the pneumatic molecules is planar and their major axis is parallel to the length of the electrodes.

The incident optical beam must be linearly polarized with its polarization axis parallel to the major axis of the pneumatic molecules.

Alternating electrical voltages are applied here to the terminals of the liquid crystal between the electrodes 510 to 580 and the back electrode 555. The action of the voltages causes the dielectric anisotropy of the liquid crystal 600 to tilt the molecules, which align their major axis parallel to the electric field. The tilting of the molecules therefore modifies the refractive indices of the medium through which the optical beam passes.

When the same voltage variation is applied to a series of electrodes 510 to 580, a period phase structure is generated in the liquid crystal 600. The repetition of this phase structure forms the period of a grating that will diffract the incident beam.

The period of the grating can be modified by increasing or decreasing the number of electrodes addressed with the same voltage variation. The deflection angle is modified by changing the period of the grating.

Figure 2:
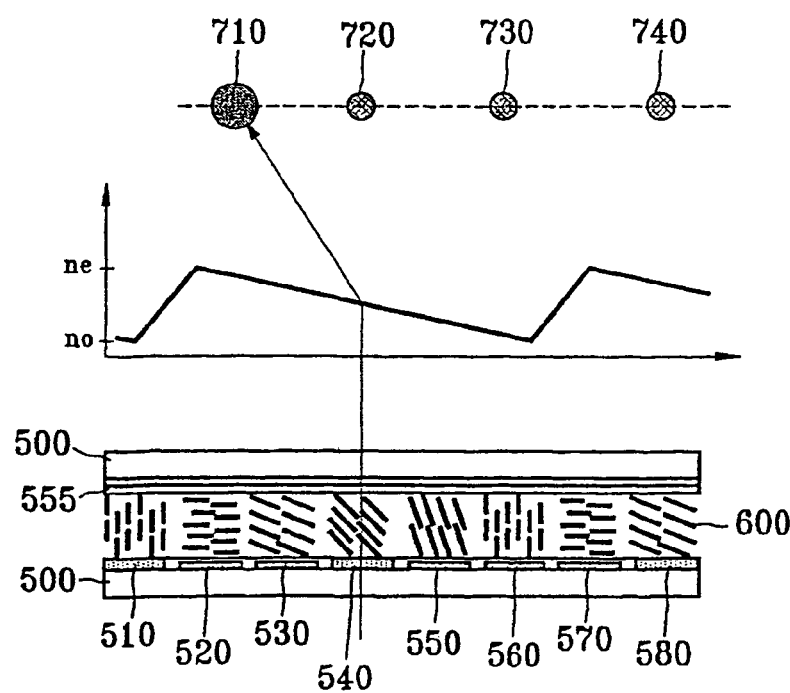
FIG. 2 is a longitudinal section of a portion of a liquid-crystal cell of the router of FIG. 1, brought into correspondence with a plot showing a distribution of optical indices in this cell portion and brought into correspondence with a series of diffraction spots obtained as output of this cell.

If the voltages are continuously increasing, the phase continuously decreases and thus generates a sawtooth grating or blazed grating. The diffraction efficiency, defined as the ratio of the light energy of a diffracted spot to the energy that would be transmitted by the grating in the absence of voltage, characterizes the deflection effectiveness. FIG. 2 shows such a liquid-crystal cell with a blazed phase profile.

One of the diffracted spots is used as output beam. It is therefore necessary for the diffraction efficiency corresponding to this spot to be as high as possible.

In this figure, one of the diffraction spots 710 to 740 (for example the first-order spot, labeled 710) will be used as deflected beam.

For a zero voltage, the index of the medium is high ($n_0$ of the liquid crystal) and for a high voltage the index is low ($n_e$ of the liquid crystal), and between these two extremes the voltages are adjusted in order to form a continuously decreasing linear profile.

Diffraction efficiencies of around 60 to 90% are obtained with this technique.

This type of router has many advantages. It is independent of the transmission rate and on the type of transport protocol since the optical beams are simply deflected without their contents being modified.

In addition, the configuration of the system, which is of the N×N type, is strictly nonblocking, that is to say, first, all the connection configurations are possible and also the reconfiguration of two connections does not disturb the connections already made.

Secondly, the principle of holographic deflection has losses that vary little with the capacity of the system since the number of optical elements through which the light passes is constant when the capacity increases and only the diffraction efficiencies decrease slightly when the angles increase. This technique therefore makes it possible ultimately to achieve high capacities in terms of number of fibers.

The system shown here is a complete holographic router unit allowing eight-fiber by eight-fiber inter-connection.

The router, its liquid-crystal optical routing matrix and its addressing electronics are integrated into a connectorized cabinet and control software in a remote PC manages the connections of the unit. Firstly the optical system will be described, then the addressing electronics and finally the addressing software.

The active optical part of the system consists of two identical liquid-crystal cells 200 and 300 for deflecting the beams. The passive optic comprises linear arrays of input optical fibers 110 to 150, and output optical fibers 410 to 450 in FIG. 1, microlenses 112 to 152 and 412 to 452 and an assembly consisting of a half-wave plate 800 and a birefringent crystal 850 in order to make the router polarization-insensitive. Mechanical parts ensure that these optical components are precisely positioned.

The liquid-crystal cells 200 and 300 have been designed from electronic circuits for flat screens. These circuits, with the Cirrus Logic 6840 reference, are column demultiplexers that can deliver quasi-analog voltages of between 0 and 5 V.

These circuits are mounted on flexible supports called TAB (Tape Automated Bonding) circuits each possessing 309 outputs (103 triads of the primary colors red, green and blue), which outputs are connected to the electrodes of the associated region, that is to say to that region of the cell associated with a beam in question, by means of an adhesive exhibiting anisotropic electrical conduction.

The TAB circuits, labeled 910 to 980, are associated respectively with such different regions out of the eight of each cell 200 and 300.

At one input of a TAB circuit, some twenty connections are connected to a peripheral circuit that manages the address voltages (circuit identifier, voltage direction, address frequency, etc.). Here, one specific TAB circuit is dedicated per optical beam.

Figure 3:
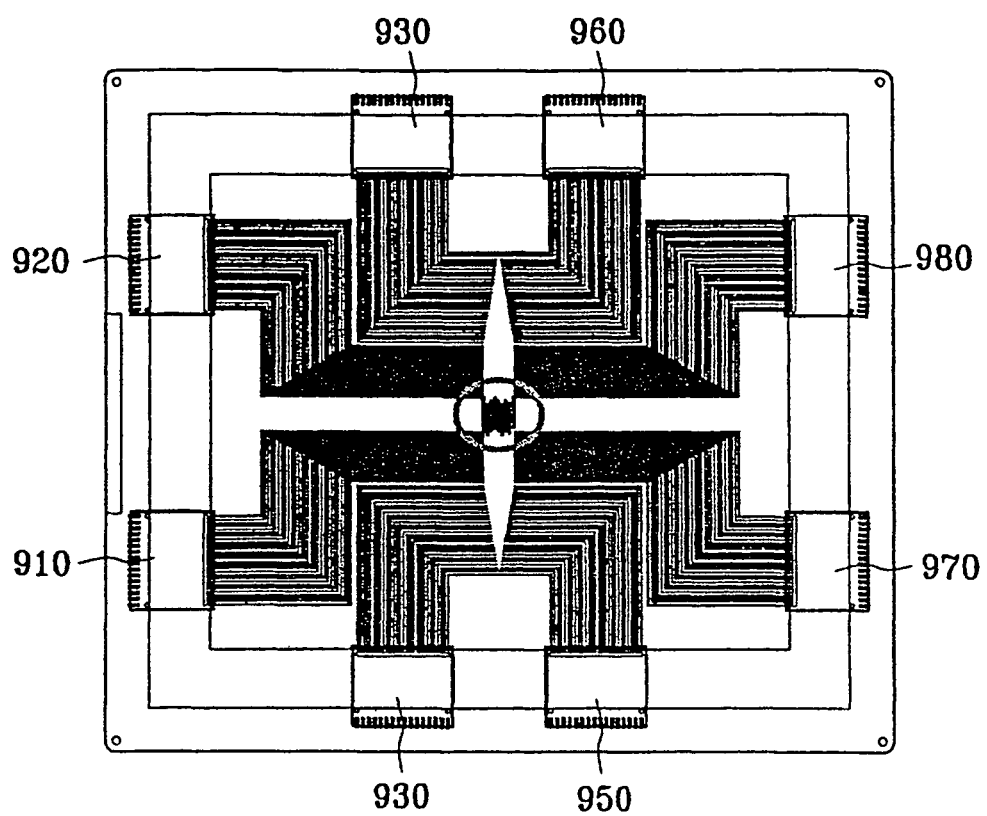
FIG. 3 shows a circuit for supplying the electrodes of liquid-crystal cells of a router according to the invention.

For each input or output cell, the router has a group of 8 TAB circuits which are distributed around a peripheral card, as shown in FIG. 3, each TAB circuit delivering control voltages to the electrodes of a said input region (on the electrodes of a said output region in the case of the output card).

The TAB circuits will serve to convert a signal indicating the input channel/output channel pair to be connected into supply signals corresponding to these electrodes, that is to say each will serve to address one of the eight separate regions of a given card where each time an optical beam passes.

Knowing that the pitch of the regions of the cell, each cell corresponding to one beam, is 1.4 mm, each active region consists of 309 electrodes 2.5 µm in width and 3 mm in length, the spacing between the electrodes is 2 µm.

For optimum precision, the number of electrodes per region is preferred to be between 100 and 500.

The conductors of a cell consist of two metal layers etched twice so as to reduce the number of cut conductors (redundancy) and also to reduce the access resistances between the TAB circuit and the active region. A metal layer on the back electrode 555 serves to define an optical mask where only the apertures let the light through.

Apart from the two liquid-crystal cells 200 and 300 positioned facing each other, the router is made up of an assembly of optical elements which makes it polarization-independent.

Figure 7:
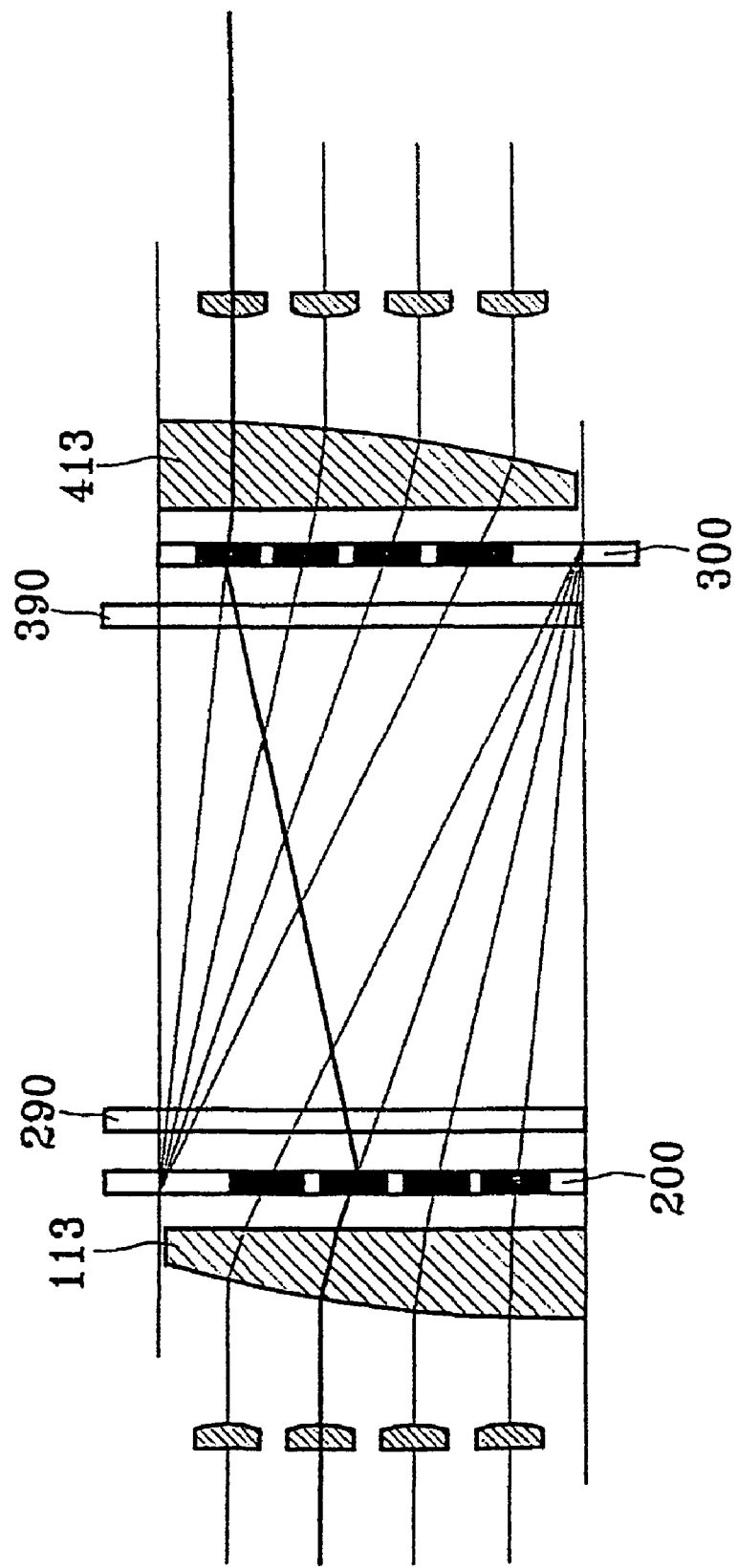
FIG. 7 is a longitudinal sectional view of a device according to the invention.

As shown in FIG. 7, in an optical routing system using reconfigurable diffractive components (such as for example liquid-crystal spatial light modulators), the optical power losses associated with the deflection of each optical beam depend on the value of the angle of deflection.

This dependence results in a variation in the total optical losses of the routing system as a function of the inputs/outputs connected. As explained below, the proposed system makes it possible, by virtue of the presence of a macrolens 113 and 413 in front of each cell 200 and 300, to obtain uniform losses over all the possible connections between the inputs and the outputs of the system, and to do so without resorting to any optical power control system.

It should be noted firstly that the loss variations of the system as a function of the connections are linked to those of the input modules (fibers+microlenses+possible polarization treatment components), of the two deflection stages, and of the output modules.

FIG. 7 shows the effect of the macrolenses on the geometric distribution of the beams.

When several lenses associated with cells are used, the optical centers of these lenses are advantageously placed on opposite sides of the light path, so that the effect of the lenses is compensated for and the deflections to be made by the deflecting cells are not too great.

For a given connection of the input i to the output j, and in the paraxial approximation, the deflection angle at the input depends, due to the presence of a convergent macrolens in front of the input cell 200 (or any other type of convergent set-up, such as a series of lenses in the same optical path, for example), only on the output (not on the input in question). This is because, since, whatever the input in question, all the zero orders of the light are focused onto the axis of the input macrolens, the same deflection is necessary, whatever the input in question, so that the first order is deflected onto a given output.

It is therefore possible to correct the input deflection losses by an attenuator with fixed attenuation distribution in front of the output cell 300, referenced 390 in FIG. 7.

Similarly, the deflection angle at the output depends, due to the presence of a convergent macrolens in front of the output cell 300 (or any other type of set-up converging substantially on the input cell, such as a series of lenses in the same optical path, for example), only on the input (not on the output in question).

It is therefore possible to correct the output deflection losses by an attenuator with fixed attenuation distribution in front of the input cell 200, referenced 290 in FIG. 7.

This beneficial property of the system, linked to the use of macrolenses, enables the system losses (in dB) to be written in the following form:

$$p(i, j) = p_e(i) + p_1(j) + p_2(i) + p_s(j)$$

with
$$\begin{cases} p_e(i) \text{ input losses, dependent} \\ \quad \text{on the input } i \\ p_1(j) \text{ input deflection losses} \\ p_2(i) \text{ output deflection losses} \\ p_s(j) \text{ output losses, dependent} \\ \quad \text{on the output } j \end{cases}$$

It is therefore possible to make the losses of the routing system uniform, independently of the inter-connection configuration thereof, by placing attenuators on all the inputs and on all the outputs of the switch. These attenuators are, according to one variant, nonprogrammable attenuators, of even lower cost.

The present device uses adjustable attenuators on the inputs and the outputs, the preadjustment of the attenuators making it possible to obtain uniform optical losses over all the connections that are possible between the inputs and the outputs of the system and are independent of the configuration of these connections. The attenuators are therefore of fixed attenuation.

The input [or output] attenuators must be preadjusted to loss values of the Cste$-p_e(i)-p_2(i)$ [or Cste$'-p_1(j)-p_s(j)$] type.

This preadjustment of the attenuators, carried out once during the system alignment phase, enables the system losses to be made independent of the connections in question or of the system configuration.

Figure 4:
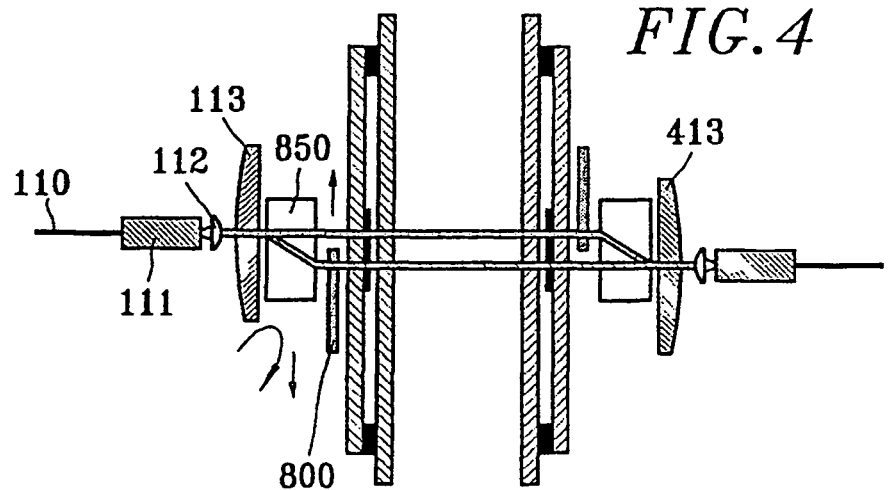
FIG. 4 is a longitudinal section of a router according to the invention.

As shown in FIG. 4, the optical assembly of the router is made insensitive to the polarization of the beam by the following means.

A macrolens 112 is placed at the output of each lens 111 and each optical beam then passes through a calcite plate 850 which splits the horizontal and vertical components of the polarization.

Upon passing through the plate 850, the ordinary ray propagates along the axis, whereas the extraordinary ray is deflected at the entrance and at the exit so as to leave parallel to the ordinary ray, but spatially separated.

A half-wave plate 800 then rotates the polarization of the ordinary beam so that it becomes parallel to that of the extraordinary beam and to the liquid-crystal molecules.

The beams are recombined at the exit of the output cell 300 by identical optical components, symmetrically with respect to the entrance, so that the optical paths of the two beams are equal. Thus, optical losses are avoided by managing the polarization dispersion.

Specific electronics have been designed to apply precise voltages to the terminals of each electrode of the liquid-crystal cells 200 and 300 by disturbing the electrodes managed in groups of 309 (per TAB and per channel, that is to say per beam).

These alternating voltages lie between 0 and 5 V rms and have an adjustable frequency from 1 kHz to 100 kHz. As it is important that the phase ramps be as linear as possible, so as to optimize the diffraction efficiencies, the Cirrus TAB circuits are programmed to correct the nonlinearity in the response of the liquid crystal on the basis of the phase/voltage, that is to say index/voltage, response curve of a given cell region.

Thus, the precision in the voltage delivered by the TAB circuits is around 40 mV. The electronics make it possible to adjust the voltages of each TAB circuit and to synchronize the alternate action of the back electrode. A programmable microprocessor situated in the TAB circuit fulfills these various functions and each module is independently adjustable, which allows any manufacturing differences in the cell to be corrected.

By dedicating one circuit per beam to be deflected, that is to say one circuit capable of supplying the electrodes of a cell region according to data indicating the switching of the channels, increased precision and optical deflection speed are obtained, together with a lower manufacturing cost.

These advantages are retained when, according to a variant, a plurality of circuits are used, each supplying a part that deflects several beams, that is to say keeping together several said regions, each part being specific to a separate circuit.

Thus, each circuit carries out specific processing for its specific regions and, by thus partitioning the processing of any one cell, processing reliability is increased and production costs decreased.

Figure 5:
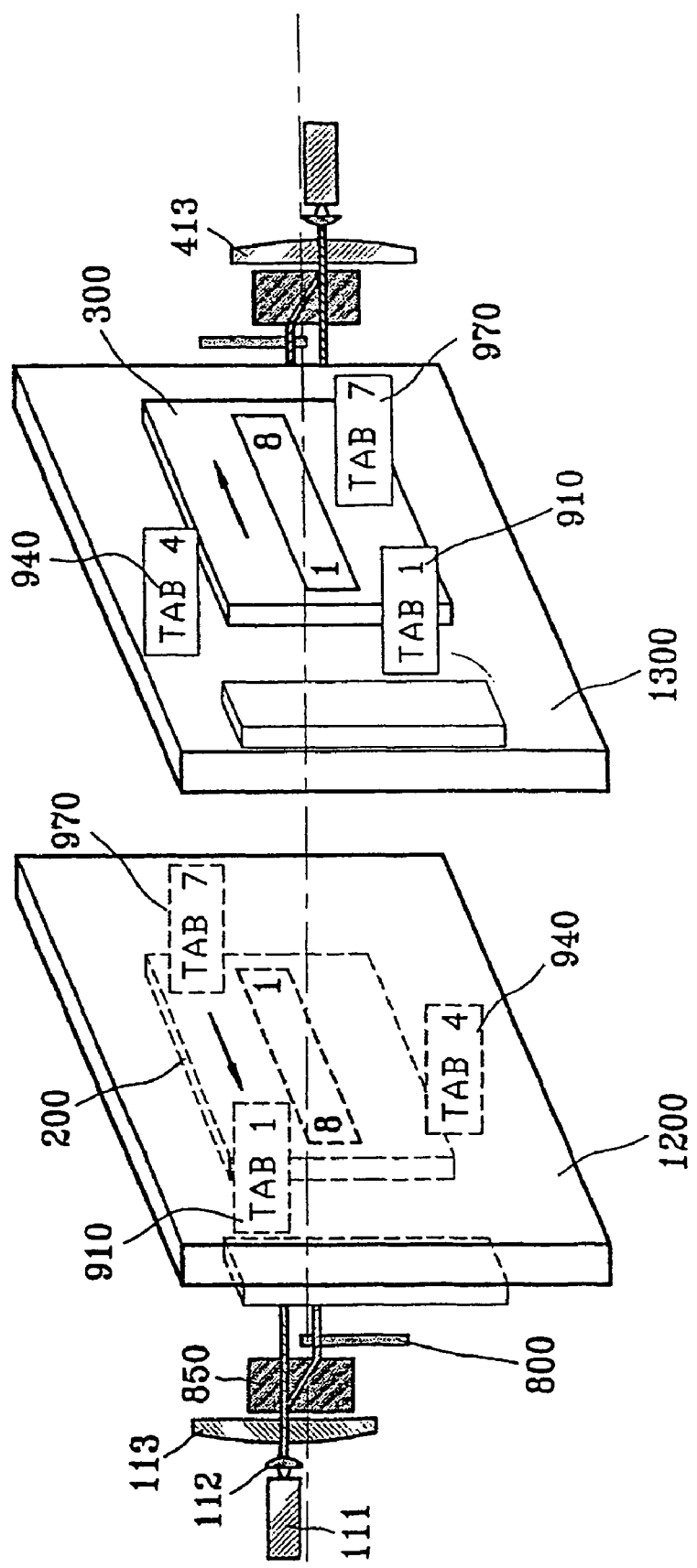
FIG. 5 depicts the same router in perspective.
Figure 6:
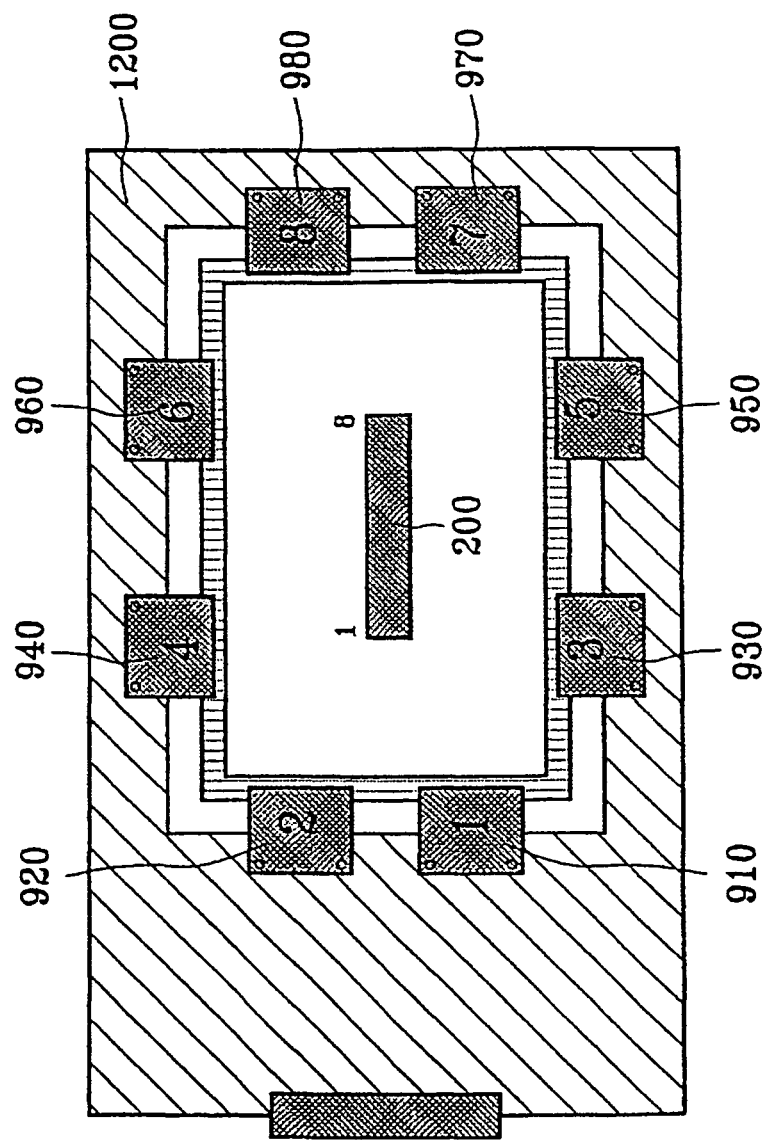
FIG. 6 depicts a deflection card of the router of FIG. 5, seen from the front.

As shown in FIGS. 3, 5 and 6, each liquid-crystal screen 200 and 300 is mounted here on a respective printed-circuit card 1200 and 1300, on which card eight control circuits similar to the abovementioned circuits 910 to 980 are mounted. Each card 1200 and 1300 therefore carries here a number of circuits equal to the number of beams to be deflected.

These circuits are distributed around a central window passing through the card, the beams passing through this window, which is covered by the liquid-crystal cell in question.

Thus, a monoblock assembly is obtained, this comprising each time the cell and the series of circuits which each convert the signals indicating the desired deflections into supply voltages for the electrodes of the cell in question.

The two cards 1200 and 1300 are therefore placed parallel to each other, but offset along the path of the optical beams.

Addressing software is used to manage all the controls of the router. The program developed under LabWindow/CVI (brand name) has three operating modes: a setting mode, a local mode or an automatic mode.

The first mode, called the "setting mode", is used during development of the apparatus before its implementation. In particular, it is used to determine the liquid-crystal nonlinearity correction and then the voltages to be applied to each electrode for the various optical interconnections.

Several options are available for obtaining these voltages. The system can calculate the voltages to be applied to the grating depending on the desired angle of deflection, this being parameterizable as a function of the wavelength. It is also possible for the address voltages to be defined manually. Finally, it is possible to fill in a table of values obtained by calculation on an application of the spreadsheet type, for example on EXCEL. From this is deduced a table of values corresponding to the interconnection of each input fiber with each output fiber.

These data are therefore stored in the form of Excel spreadsheets that the software knows how to read or write. The totality of the interconnections represents 64 tables. The optimized configurations, from an input fiber i to an output fiber j, are then stored in the electronics close to the system, that is to say in the memory of each TAB circuit.

The second mode or "local mode" serves to operate the router simply, by calling up the optimized configurations that have been stored beforehand in memory. The connections are made by actuating the graphical commands of a table possessing eight inputs and eight outputs. The central computer or PC, on which the software runs, then sends coupling indication information to the various TAB circuits. These commands activate the stored configurations.

The "automatic" mode allows this equipment to be used in a complete switching chain with other hardware upstream and downstream. All the TAB circuits are then controlled via a GIPB card and an IEEE bus from a central computer different from the local control PC. The IEEE commands activate the optimized configurations that were stored in setting mode.

It is possible to set up a link budget from various factors:

Unlike the performance of refractive lenses, the performance of the linear arrays of holographic lenses having multiple phase levels proved to be compatible with the criteria for precision in the relative positioning of the center of the lenses. The linear arrays of microlenses used here were manufactured by Herriot Watt University in Edinburgh—they have four phase levels and are antireflection-coated. The ratio of the transmitted beam power to the incident beam power is between 70 and 75%, the rest of the light being lost in beams diffracted out of the system.

The transmission of the liquid-crystal cells, which are also antireflection-coated, is limited by the transmission of the ITO. We measured the transmissions to be between 85 and 90%.

Moreover, only part of the light is deflected in the desired direction. The term "diffraction efficiency" means the ratio of the useful transmitted beam power to the total transmitted power. This efficiency varies almost linearly from 98% for an angle of deflection close to 0 to 50% for a deflection of 5°.

The minimum angle of deflection is 0.22° and the maximum angle is 2.7°; the respective efficiencies are 96% and 70%.

The overall transmission of the assembly of the two cells is therefore expected to vary from $0.85^2 \times 0.7^2 = 35\%$ to $0.85^2 \times 0.96^2 = 66\%$. In the present embodiment, no correction for equalizing the transmissions is provided. However, since the angle of deflection of the input hologram depends only on the number of the output and vice versa, this monodependence being all the more exact when the macrolenses 114 and 414 described above are used, the transmission of the system is equalized, according to a variant, by adding optical densities at each input and at each output.

The table below gives the transmission of the combination of the hologram planes for all possible links.

| I↓/O→ | 1 | 2 | 3 | 4 | 5 | 6 | 7 | 8 |
|---|---|---|---|---|---|---|---|---|
| 1 | 20.5 | 22.1 | 27 | 28.5 | 28.2 | 26.1 | 36.6 | 44.8 |
| 2 | 23.4 | 25.8 | 31.1 | 32.6 | 31.9 | 32.9 | 40.0 | 48.2 |
| 3 | 25.5 | 30.2 | 32.8 | 35.0 | 37.0 | 35.5 | 45.5 | 51.7 |
| 4 | 27.6 | 31.2 | 33.4 | 35.8 | 38.2 | 39.2 | 43.4 | 60.0 |
| 5 | 33.4 | 38.5 | 41.3 | 43.1 | 44.2 | 44.3 | 52.2 | 58.5 |
| 6 | 34.8 | 40.6 | 44.7 | 47.5 | 48.4 | 48.2 | 57.5 | 63.0 |
| 7 | 38.0 | 42.9 | 46.4 | 50.1 | 51.7 | 54.4 | 60.7 | 65.7 |
| 8 | 44.2 | 47.8 | 51.3 | 54.9 | 55.0 | 57.7 | 61.8 | 62.3 |

Of course, the arrangements described here in relation to an in-plane deflection router are also advantageous in the case of a two-dimensional deflection router.

[1] JDS commercial documentation.
[2] 8×8 Optical Matrix Switch. NEL, NTT Electrics Technology Corp., Commercial Documentation
[3] JDS Uniphase Corporation, 1768 Automation Parkway San Jose, Calif 95131.
[4] Transparent optical cross-bar switch using liquid-crystal optical light modulator arrays, K. Noguchi, ECCO'97, Edinburgh.
[5] Holographic switching between single mode fibers: evaluation of a 16×16× demonstrator and perspectives, L. Bonnel & P. Gravey, Photonics in switching, Sendai, Japan 1996.
[6] N. Wolfer, B. Vinouze and P. Gravey. Optics Communications, 160 (1999) p. 42–46.

The invention claimed is:

1. An optical beam router comprising:
a series of input optical channels (110, . . . , 150) and a series of output optical channels (410, . . . , 450),
two liquid crystal cells (200, 300) capable respectively of deflecting an optical beam exiting an input channel (110, . . . , 150) or entering an output channel (410, . . . , 450), these two cells (200, 300) each comprising a series of electrodes (510, . . . , 580) each capable of orienting liquid crystals (600) when such an electrode is supplied with a supply voltage, these electrodes (510, . . . , 580) being distributed in regions (210, . . . , 250, 310, . . . , 350), each region corresponding to a single input channel (110, . . . , 150), or a single output channel (410, . . . , 450),
means (910, . . . , 980) for supplying the electrodes (510, . . . , 580) with selected voltages, wherein the means for supplying the electrodes with selected voltages includes a series of separate electronic circuits (910, . . . , 980), each being connected to at least one different region (210, . . . , 250) of a given cell (200, 300), these circuits (910, . . . , 980) each being capable of converting a respective control signal indicating a channel to be coupled to the channel of this region (210, . . . , 250, 310, . . . , 350) into a series of voltages for supplying the electrodes (510, . . . , 580) of the region (210, . . . , 250, 310, . . . , 350); and
a support card (1200, 1300) having a through-opening, in that one of the cells (200, 300) is mounted on the card (1200, 1300) so as to cover this opening and in that a series of circuits (910, . . . , 980) associated with various said regions of the cell is mounted on the support card (1200, 1300),
wherein each of the electronic circuits (910, . . . , 980) is programmed to correct any nonlinearity in the optical index/supply voltage response of the liquid crystals of the associated region (210, . . . , 250, 310, . . . , 350).

2. The optical beam router as claimed in claim 1, wherein each electronic circuit (910, . . . , 980) includes a memory in which sets of values of electrode voltages are stored, each set corresponding to a deflection of the beam passing through the associated region when the electrodes of the region are supplied with these voltages.

3. The optical beam router as claimed in claim 1, characterized in that each electronic circuit(910, . . . , 980) is capable of delivering alternating voltages to the electrodes (210, . . . , 250, 310, . . . , 350) of the region to which it is connected.

4. The optical beam router as claimed in claim 1, wherein each region (210, . . . , 250, 310, . . . , 450) associated with a channel (110, . . . , 150, 410, . . . , 450) comprises a number of electrodes (510, . . . , 580) between 100 and 500.

5. The optical beam router as claimed in claim 1, further including means for adding optical densities in front of one of the two liquid-crystal cells (200, 300) with a distribution suitable for compensating for transmission inhomogeneities that depend on input channel/output channel pairs.

6. The optical beam router as claimed in claim 1, further including means (850) for splitting a horizontal polarization component from a vertical polarization component and means (800) for converting one of these components into its perpendicular component, said means for splitting a horizontal polarization component from a vertical polarization component being located upstream of an upstream cell (200) out of the two liquid-crystal cells (200, 300), together with means for converting one of the two components into its perpendicular component and means for combining two components, said means for combining two components being downstream of a downstream liquid-crystal cell (300).

7. The optical beam router as claimed in claim 6, wherein the upstream component-splitting means (850) introduce a path difference between the two components, upstream of the first liquid-crystal cell (200) and in that the means for combining the two components are designed to compensate for this path difference.

8. The optical beam router as claimed in claim 1, further including, for at least one of the cells (200, 300), a separate electronic circuit for each region of the cell (200, 300), each region being associated with a given single channel (110, . . . , 150, 410, . . . , 450), each of our circuits being capable of converting a control signal indicating a channel to be coupled to the channel of the associated region (210, . . . , 250, 310 , . . . , 350) into a series of supply voltages for the electrodes (510, . . . , 580) of the region.

9. The optical beam router as claimed in claim 1, wherein at least one of the liquid-crystal cells (200, 300) has electrodes (510, 580) which each consist of two metal layers etched twice.

10. The optical beam router as claimed in claim 1, further including a convergent optical assembly (113, 413) placed so as to overlap a first of the two cells (200, 300) and the focal point of which optical assembly, defined in relation to the light path in the router, is in the vicinity of the plane of the other cell, the router furthermore including means (290, 390) producing a series of different optical attenuations that are applied to the various channels adjacent to this other cell and are distributed according to these various channels, each attenuation applied to a channel in question not being dependent on the channel which momentarily is optically associated with this said channel in question.

11. The optical beam router as claimed in claim 10, wherein said other cell is also provided with a convergent optical assembly (113, 413) having its focal point in the vicinity of the first cell (200, 300) and in that said first cell is provided with means (290, 390) producing a series of different optical attenuations that are applied to the various channels adjacent to this first cell and are distributed according to these various channels, each attenuation of a channel in question not being dependent on the channel which momentarily is optically associated with said channel in question.

12. The optical beam router as claimed in claim 10 or claim 11, wherein said convergent optical assembly or one of said convergent optical assemblies (113, 413) consists of a convergent lens covering a cell (200, 300) and having its focal point in the vicinity of the opposite cell.

* * * * *